(12) United States Patent
Jung

(10) Patent No.: US 9,638,136 B2
(45) Date of Patent: *May 2, 2017

(54) HIGH THERMAL EFFICIENCY SIX STROKE INTERNAL COMBUSTION ENGINE WITH HEAT RECOVERY

(71) Applicant: Philip Owen Jung, Mobile, AL (US)

(72) Inventor: Philip Owen Jung, Mobile, AL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/628,222

(22) Filed: Feb. 21, 2015

(65) Prior Publication Data

US 2016/0245235 A1  Aug. 25, 2016

(51) Int. Cl.
F02M 25/03 (2006.01)
F02B 75/02 (2006.01)
F02G 5/02 (2006.01)
F02B 47/02 (2006.01)

(52) U.S. Cl.
CPC ............ F02M 25/03 (2013.01); F02B 47/02 (2013.01); F02B 75/02 (2013.01); F02B 75/021 (2013.01); F02G 5/02 (2013.01)

(58) Field of Classification Search
CPC .. F01K 23/065; F02M 25/035; F02M 25/038; F02B 47/02; F02B 75/021
USPC ..................... 60/618; 123/25 P, 64
See application file for complete search history.

(56) References Cited

U.S. PATENT DOCUMENTS

| 1,217,788 | A |  | 2/1917 | Liedtke |
| 1,339,176 | A |  | 5/1920 | Dyer |
| 2,066,151 | A | * | 12/1936 | Johansson ............... F01B 17/04 60/679 |
| 2,671,311 | A |  | 3/1954 | Rohrbach |
| 2,944,627 | A |  | 7/1960 | Skarstrom |
| 3,085,379 | A |  | 4/1963 | Kiyonaga et al. |
| 3,608,529 | A |  | 9/1971 | Smith et al. |
| 3,696,795 | A |  | 10/1972 | Smith et al. |
| 4,143,518 | A |  | 3/1979 | Kellogg-Smith |
| 5,400,746 | A |  | 3/1995 | Susa et al. |
| 5,415,683 | A |  | 5/1995 | Leavitt |
| 6,722,352 | B2 |  | 4/2004 | Smolarek et al. |
| 6,742,507 | B2 |  | 6/2004 | Keefer et al. |
| 7,021,272 | B2 |  | 4/2006 | Singh |
| 7,958,872 | B1 | * | 6/2011 | Schechter ............. F02M 25/03 123/568.11 |
| 8,006,654 | B1 | * | 8/2011 | Jung ....................... F02B 47/02 123/25 C |
| 8,061,140 | B2 |  | 11/2011 | Harmon |

(Continued)

*Primary Examiner* — Thomas Denion
*Assistant Examiner* — Mickey France

(57) ABSTRACT

A six stroke high thermal efficiency engine and a method for operating such an engine are disclosed. Oxygen or oxygen-enriched air is used as the oxidizer, heat is recovered from the two exhaust strokes, superheated steam is used in the second power stroke, and high levels of exhaust gas from stroke four are recirculated. Lean burn combustion is utilized to produce an oxygen rich exhaust which results in very low levels of particulates, unburned hydrocarbons, and carbon monoxide. Due to high thermal efficiency, carbon dioxide emissions are reduced per unit of power output. Use of oxygen or oxygen-enriched air as the oxidizer produces an exhaust containing very low levels of nitrogen oxides. The engine is insulated to conserve heat, resulting in reduced engine noise. An engine with high thermal efficiency, quiet operation, and low emissions is the result.

11 Claims, 11 Drawing Sheets

(56) References Cited

U.S. PATENT DOCUMENTS

| | | |
|---|---|---|
| 8,176,884 B2 | 5/2012 | Tewari et al. |
| 8,479,690 B2 | 7/2013 | Maro et al. |
| 8,661,816 B2 | 3/2014 | Mathews et al. |
| 8,776,761 B2 | 7/2014 | Aledavood |
| 8,807,094 B1 | 8/2014 | Lopez-Pino |
| 2008/0115922 A1* | 5/2008 | Horek ............... F28D 9/00 165/240 |
| 2008/0223332 A1* | 9/2008 | Maro ............... F02B 43/10 123/25 R |
| 2011/0000671 A1* | 1/2011 | Hershkowitz ............ C01B 3/38 166/305.1 |
| 2012/0060493 A1* | 3/2012 | Matthews ............... F01N 5/02 60/602 |
| 2013/0000618 A1* | 1/2013 | Groenendijk ....... F02D 13/0276 123/568.12 |
| 2013/0186071 A1* | 7/2013 | Mori ............... F01N 9/002 60/274 |

* cited by examiner

HIGH THERMAL EFFICIENCY SIX STROKE INTERNAL COMBUSTION ENGINE WITH HEAT RECOVERY

CROSS-REFERENCE TO RELATED APPLICATIONS

Not applicable

FEDERALLY SPONSORED RESEARCH

Not applicable

SEQUENCE LISTING OF PROGRAM

Not applicable

BACKGROUND OF THE INVENTION

1. Field of the Invention

The present invention relates to reciprocating internal combustion engines in general, and more specifically, to engines equipped with heat recovery, heat recycle, and other heat conserving systems. The present invention also relates to a reciprocating internal combustion engine with reduced specific emissions of carbon dioxide, unburned hydrocarbons, carbon monoxide, and nitrogen oxides per unit of power produced.

2. Description of Prior Art

The internal combustion (IC) engine is well over 100 years old. The original US patent was issued to Nicolaus Otto on Aug. 14, 1877 for a four-stroke spark ignited (SI) engine. An earlier patent was issued to Otto for a four-stroke engine in Germany. A compression ignition (CI) engine, or Diesel engine, was invented a few years after this. Other than rotary engines, which were introduced many years later, internal combustion engines have powered our society and are found almost everywhere. These engines have primarily been both two and four stroke varieties.

Many improvements have been made to both the SI and CI engines over the years to improve their thermal efficiencies and to reduce their particulate emissions and noxious chemicals emissions, particularly unburned hydrocarbon (HC), carbon monoxide (CO), and mixed nitrogen oxides (NOx). Thermal efficiencies of spark ignited engines have increased over this time frame from single digits up to about 32% in everyday usage. One research study showed a thermal efficiency approaching 43% on a four-stroke SI engine fueled with and optimized for neat methanol (Matthew Brusstar, et al., "High Efficiency and Low Emissions from a Port-Injected Engine with Neat Alcohol Fuels", SAE Paper 2002-01-2743, 2002). This high efficiency was made possible by modifying the engine to make use of the higher octane of alcohol compared to gasoline. The CI engines have achieved 52% to 57% thermal efficiency in large slow speed maritime applications such as the MAN S80ME-C7 with a specific fuel consumption of 156 to 168 g of fuel/KWh. These efficiencies are the peaks or maximums, not the average efficiencies. Engines are currently being developed which claim thermal efficiencies up to 60%, but these have not been commercialized. The ratio of weight to power output of IC engines has dropped over this same period, thus allowing their application in high power transportation demands all the way down to their use in hand tools and model airplanes.

A reciprocating internal combustion (IC) engine always includes one or more cylinders. Within each cylinder is a reciprocating piston connected to a crankshaft, which converts the reciprocating motion of the piston to a circular motion. Four strokes are performed in a conventional IC engine; these include the air or oxidizer intake stroke, compression stroke, power or combustion stroke, and the exhaust stroke. These form the complete cycle. Two stroke IC engines are also very common, but they are less efficient and emit more noxious chemicals than a four-stroke engine.

The main problems with internal combustion engines is the low thermal efficiency plus the release of particulates, unburned hydrocarbons (HC), carbon monoxide (CO), and nitrogen oxides (NOx). Thermal efficiency is the useful work output of an engine divided by the heat put into the engine, which is primarily fuel combusted at its lower heating value plus the heat entering with the air. The peak thermal efficiency for a SI engine is about 32% in an automotive application, but the thermal efficiency of the same engine at its normal operating point may be only 15 to 20% or lower. In the 20% thermal efficiency case, 80% of the heat energy entering is discarded as waste heat and is not converted to useful work. In a conventional engine, this heat is lost through the exhaust, through the walls of the engine, and through the cooling system, whether the engine is air cooled or liquid cooled. Friction inside the engine also accounts for 10 to 25% of the gross work output from the engine. This friction ends up as heat exiting the engine, so this friction is already included in the peak efficiency figures. There are ways of increasing the thermal efficiency of an engine, but in each case, there are tradeoffs. Increasing the compression ratio of an engine can raise engine efficiencies, but this is limited by the combustion characteristics of the fuel. Air-to-fuel ratios can also be varied. In this case, less than stoichiometric fuel can be utilized; meaning that excess air is present. Combustion in this case produced too much NOx in the exhaust. NOx is a result of high temperature combustion when combined with high levels of nitrogen and some oxygen. Lower temperature combustion coupled with less nitrogen would drastically reduce or essentially eliminate the formation of NOx. Combustion can also be greater than stoichiometric, thus producing an exhaust with particulates, unburned hydrocarbons (HC), and carbon monoxide (CO). In present day SI engines, the air-to-fuel ratio must be stoichiometric for the current after-treatment catalysts to give emissions which meet or exceed government mandates.

There are other ways of increasing the thermal efficiency of IC engines. These have included turbocharging, supercharging, recycling the heat, double or triple reduction of exhaust pressure, port fuel injection, direct fuel injection, homogeneous charge compression ignition, and other ignition regimes. Work is on-going on variable valve timing, camless valve operation, and cylinder deactivation to name a few. These have increased and are increasing thermal efficiencies but these improvements need to occur at a more rapid rate. A paradigm shift in thermal efficiency and a reduction in emissions are needed and both are provided by this invention.

There have been many variations of the four-stroke IC engine in an effort to improve the thermal efficiency. Others have recognized this deficiency in the four-stroke engine and have made steps to recover and recycle this heat. These efforts have resulted in increasing the number of strokes from four to six or eight or more. In a six stroke engine, strokes one through four generally include oxidizer intake, compression, power or combustion, and exhaust as in a conventional four-stroke engine. Strokes five and six and less frequently strokes three and four vary depending on the invention and the goal of the inventor. A fluid, either water, air, or steam is injected in stroke five to recover some of the heat remaining in the cylinder, piston, and cylinder head. This fluid is expanded or vaporized from the heat remaining in the metal of the cylinder, piston, and cylinder head and is thus pressurized without additional fuel being consumed. In the case of water being added, this water is vaporized to steam with its pressure dependent on the temperature and heat contained in the metal of the cylinder, piston, and cylinder head. This produces an additional power stroke without the introduction of additional fuel. Hot water is sometimes used rather than cold water and this allows the pressure developed during stroke five to be greater and thus to generate more work. Stroke six is the exhaust stroke to remove either the vaporized water or heated fluid from the cylinder before repeating the oxidizer intake stroke. There are, of course, other variations of this theme but all give a second power stroke within the six strokes of the engine.

There are many examples of six stroke engines in the patent literature. There are also examples in the patent literature of the use of steam and water inside combustion chambers, oxygen-enriched air and pure oxygen used as the oxidizer, and heat recovery systems in both CI and SI internal combustion engines. None of these patents use these elements in the same way as this invention.

The six stroke engine described in this invention has strokes two and four the same as other four or six stroke engines; however, strokes one, three, five, and six are different. The drawings and the descriptions that follow will clearly show those differences and the advantages of this six stroke engine over prior art.

BRIEF SUMMARY OF THE INVENTION

This invention presents a high efficiency reciprocating six stroke internal combustion engine and a method for operating the six different strokes of this engine. A method to recover and recycle heat from exhaust strokes four and six is included which increases the work output of this engine without requiring additional fuel. The heat normally removed by the engine water jacket and radiator is also recovered and recycled in the waste heat recovery system. The oxidizer used in stroke one has been modified to reduce the heat lost through stroke four exhaust flow and to allow higher exhaust gas recirculation. This oxidizer is produced by enriching the air through the removal of almost all nitrogen, carbon dioxide, and water. Enriching the oxidizer to essentially pure oxygen or to greater than 80% oxygen means that the oxygen concentration in the exhaust gas can be independently controlled to allow excess oxygen in the exhaust. This high oxygen concentration in the oxidizer makes the oxygen concentration in the hydrocarbon exhaust gas an independent variable. Excess oxygen in the exhaust allows almost all hydrocarbons and carbon monoxide to be oxidized to carbon dioxide and water. Particulates are also diminished as the excess oxygen can further oxidize these particles, thus reducing or eliminating them. Removal of nitrogen from the oxidizer means that there will be practically no NOx in the engine exhaust. This invention and its included method of operation result in an engine with greatly increased thermal efficiency coupled with reduced emissions. This six stroke engine includes a crankcase, at least one rotating crankshaft, and connecting rods which convert the reciprocating motion of one or more pistons to the rotating motion of the crankshaft. These pistons reciprocate in a cylinder equipped with valves, which allow for six different strokes of this engine. These are stroke 1: intake of oxidizer with or without recirculated exhaust gas, stroke 2: compression with injection of fuel, stroke 3: combustion of fuel resulting in power stroke one, stroke 4: exhaust to the heat recovery system, stroke 5: superheated steam injection into the cylinder resulting in power stroke two, and stroke 6: exhaust of steam to the heat recovery system. The engine, the conduits between the various parts, and the heat recovery system are well insulated in order to retain as much heat as practical. This thermal insulation also captures engine noise, thus resulting in a quiet engine. The two exhausts from this engine, strokes four and six, go to the heat recovery system where heat is recovered to be recycled as superheated steam in stroke five. The flow of superheated steam must be controlled due to its limited availability. Superheated steam is used rather than saturated steam to reduce or eliminate the condensation of this steam in the combustion chamber. A portion of the exhaust gas from stroke four is recirculated to stroke one after heat recovery. This recovered heat, returned as superheated steam, is converted to work without the need for additional fuel. Fuels which can be used in this engine include hydrocarbons, hydrogen, or mixtures thereof. Hydrocarbons include, but are not limited to: natural gas, reformed gas, methane, ethane, butane, propane, alcohols, gasoline, jet fuel, diesel fuel, fuel oil, and finely ground ash-free coal. Coal may be dissolved in the hydrocarbon fuel in order to filter out the ash before entering the engine. Hydrocarbon fuels containing dissolved coal would still be referred to as hydrocarbons. This process of operating an internal combustion engine with the recycling of heat produces a more thermally efficient engine. There are several advantages of this invention; the most obvious include less fuel required for the work delivered, less noxious emissions including carbon dioxide for the work delivered, and less noise.

BRIEF DESCRIPTION OF THE DRAWINGS

The figures of the engine included are simplified cross sectional side views of a single cylinder and piston which depict schematically the six different strokes, and the heat recovery and recycle system. Also included in the figures are two methods of enriching air to provide a high oxygen concentration for the oxidizer, and one method using oxygen derived from the cryogenic separation of air. In the latter case, this oxygen is delivered as a liquid from an outside source. This invention is applicable to both spark ignition (SI) and compression ignition (CI) engines. Where a spark plug is included, it must be understood that an SI engine is implied and where the spark plug is not included, a CI engine is implied. For clarity, the spark plug is included in all figures except FIG. 1*b*. This six stroke engine and its associated parts are well insulated to retain as much heat as practical. This is not shown in the drawings for purposes of clarity.

FIG. 2 depicts the second stroke of the engine. In this stroke, the crankshaft rotates from 180 to 360 degrees (from BDC to TDC). The previously admitted oxidizer and recirculated exhaust gas are compressed and fuel is added as the piston approaches 360 degrees (TDC). The spark plug may be energized slightly before TDC but for simplicity this is shown in the next figure.

FIG. 3 depicts the third stroke and occurs as the crankshaft rotates between 360 and 540 degrees (from TDC to BDC). The spark plug is energized proximate 360° crankshaft rotation angle. Proximate should be understood in this case to be between 50° before to 50° after 360° (310° to 410°). This produces ignition of the compressed fuel and oxygen and drives the piston downward as the crankshaft rotates to the 540° location (BDC). Complete combustion and expansion due to the ignition of the fuel and oxygen are completed during this stroke. Fuel may be injected several times during this stroke. This produces the first of two power strokes in this engine.

FIG. 4 depicts the fourth stroke and occurs as the crankshaft rotates between 640 and 720 degrees (from BDC to TDC). The hot gases from ignition are exhausted to the steam super heater exchanger.

FIG. 5 depicts the fifth stroke and occurs as the crankshaft rotates between 720 and 900 degrees (from TDC to BDC). Superheated steam is admitted early in this stroke and possibly somewhat before TDC and drives the piston down as the crankshaft rotates to 900 degrees (TDC). This produces the second power stroke in this engine. The use of superheated steam inside the combustion chamber rather than saturated steam reduces the possibility of steam condensation during this stroke.

FIG. 6 depicts the sixth and final stroke as the crankshaft rotates between 900 and 1080 degrees (from BDC to TDC). The exhaust from this stroke goes to a heat recovery heat exchanger.

Figure 1:
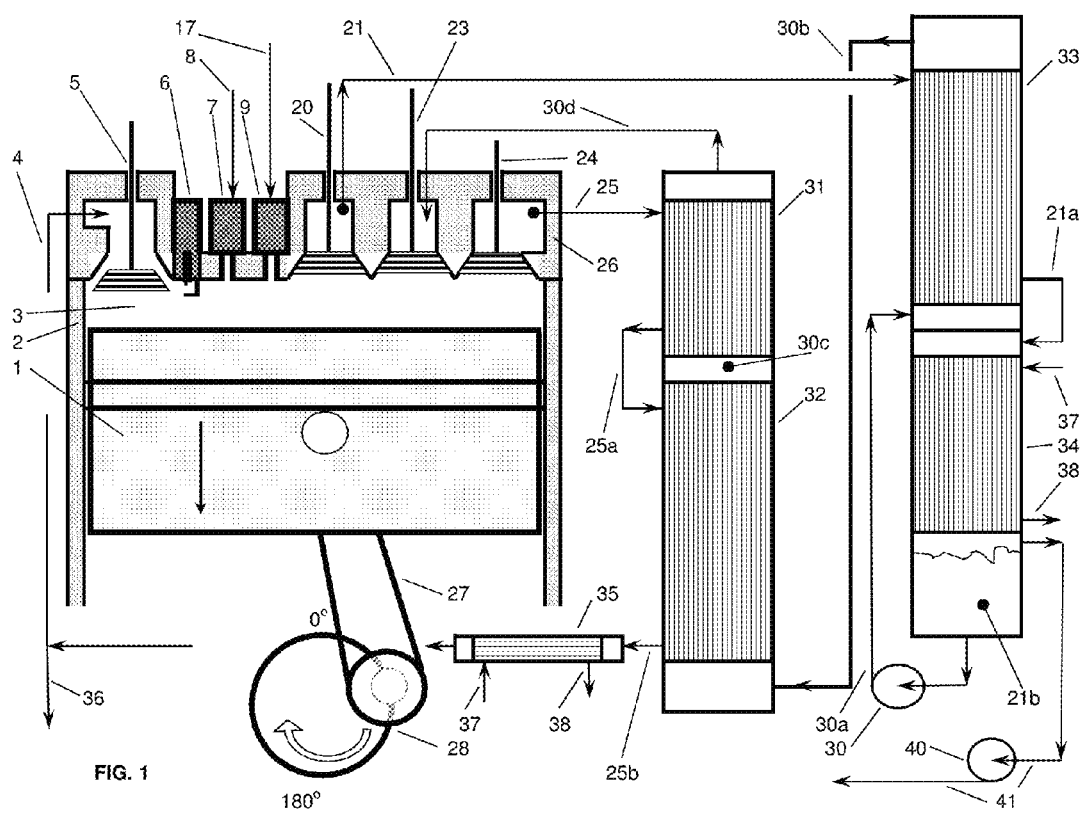
FIG. 1 depicts the six stroke engine including heat recovery and recycle but excludes the system for supplying the oxidizer. The primary purpose for this figure is to briefly describe the heat recovery system. The description for each individual stroke will follow. The hot gas exhaust from stroke 4 will enter a steam super heater exchanger where the heat will be exchanged with steam to produce superheated steam. The partially cooled hot exhaust gas will then go through a vaporizer heat exchanger for further heat recovery. A portion of the cooled exhaust gas will be recirculated to stroke 1, with or without further cooling. The superheated steam will be used in stroke 5 to produce a second power stroke. The spent steam from stroke 5 will be exhausted in stroke 6 to a second set of heat exchangers for further heat recovery followed by a condenser to convert the steam back to its liquid state. Non-condensable gases will be removed before this liquid water is reheated for reuse. Oxygen-enriched air or essentially pure oxygen is used as the oxidizer of the fuel but its use also gives several distinct advantages over the use of air. These advantages include increased thermal efficiency due to reduced heat lost in the exhaust. There is also a reduction in particulates, carbon dioxide, carbon monoxide, unburned hydrocarbons. The low combustion temperature and low nitrogen content produces low NOx emissions. A further advantage is that the oxygen in the stroke 4 exhaust can be controlled independently of what is required for the stoichiometric oxidation of fuel. Another advantage is that the combustion temperature can be controlled by varying the ratio of fuel to oxidizer and recirculated exhaust gases.

REFERENCE NUMERALS FOUND ON THE DRAWINGS 1 piston
2 cylinder
3 combustion chamber
4 recirculated exhaust gas conduit
5 recirculated exhaust intake valve
6 spark plug
7 fuel injection valve
8 fuel conduit
9 oxidizer injection valve
10 air intake into oxygen-enriched air generator
11 air filter
12 compressor
13 adsorbent bed
14 vacuum pump
15 nitrogen-enriched air conduit
16 oxidizer accumulator
17 oxidizer conduit
18 filler conduit
20 steam exhaust valve
21 steam exhaust conduit
21a partially cooled steam conduit
21b condensed steam reservoir 23 superheated steam valve
24 combustion exhaust valve
25 combustion exhaust conduit
25a partially cooled exhaust conduit
25b further cooled exhaust conduit
26 cylinder head
27 connecting rod
28 crankshaft
30 water recirculation pump
30a water conduit
30b partially heated water conduit
30c steam conduit
30d superheated steam conduit
31 steam super heater exchanger
32 vaporizer heat exchanger
33 heat recovery heat exchanger
34 condenser heat exchanger
35 exhaust gas heat exchanger
36 exhaust discharge conduit
37 cooling water supply conduit
38 cooling water return conduit
40 non-condensables vacuum pump
41 non-condensables conduit

DETAILED DESCRIPTION OF THE INVENTION

For simplicity in describing this invention, the figures illustrate only one piston inside one cylinder attached to one crankshaft. This invention may use any number of cylinders and pistons as well as multiple crankshafts. The figures are illustrative and are not drawn to scale but schematically depict this engine and the method of operating this engine. This engine may be either spark ignited (SI), compression ignited (CI), combination of SI and CI, or utilize some other means of igniting the combustible mixture. The fuels to be used in this engine include all hydrocarbons, coal dissolved in hydrocarbons with the ash removed, as well as hydrogen or mixtures thereof. It is understood that cylinder 2; cylinder head 26; connecting conduits 4, 17, 21, 21a, 25, 25a, 25b, 30a, 30b, 30c, and 30d; pump 30; and heat exchangers 31, 32, 33, 34 and 35 are all insulated to retain heat. This insulation will also absorb noise resulting in a quiet engine. This insulation is not shown for clarity on the drawings. Where a spark plug is included, an SI engine is implied, and where the spark plug is not included, a CI engine is implied. In actual practice, a spark plug or other device may be included in a CI engine to insure ignition at a predetermined point in engine rotation. For clarity of understanding, the spark plug is included in all figures except FIGS. 1b, 7, 8, and 9.

FIG. 1 is a cross sectional view of piston 1 inside cylinder 2, and cylinder head 26 with associated valves and injection valves; steam super heater exchanger 31, vaporizer heat exchanger 32, heat recovery heat exchanger 33, condenser heat exchanger 34, and exhaust gas heat exchanger 35; water recirculation pump 30, and non-condensables vacuum pump 40; and connecting conduits 4, 8, 17, 21, 21a, 21b, 25, 25a, 25b, 30a, 30b, 30c, 30d, 37, 38, and 41; and water reservoir 21b. FIG. 1 will be used to describe the heat recovery system. The six different strokes of the engine will be described in detail in FIGS. 1a, 1b, 2, 3, 4, 5, and 6. The heat exchangers in this figure are represented graphically as shell and tube heat exchangers but in no way should this graphical representation limit the heat exchangers to this type of device. Other heat exchangers which could be used include plate and frame, spiral, double pipe, welded or brazed plates, extended surface exchangers, and others. The heat exchange surfaces are shown in combined bodies, but the heat exchange surfaces can each be in their own body or the same function can be spread across more than one body. The first engine exhaust entering the heat recovery system occurs during stroke 4 which is shown in FIG. 4 and is from combustion exhaust conduit 25 going into the shell side of steam super heater exchanger 31. Heat from the engine through 25 is exchanged with steam entering the tube side of 31 through steam conduit 30c. This superheated steam exits the tube side of 31 through superheated steam conduit 30d and returns to the engine through superheated steam valve 23 when opened. The now partially cooled combustion exhaust exits the shell side of 31 through partially cooled exhaust conduit 25a and enters the shell side of vaporizer heat exchanger 32. The further cooled exhaust exits the shell side of 32 through further cooled exhaust conduit 25b. The exhaust from 25b then enters the exhaust gas heat exchanger 35 which may or may not be operating depending on the need for power from the engine. The heat from the engine through 25b will be removed through controlling the flow of cooling water supply conduit 37 and its return through cooling water return conduit 38. The cooled or uncooled exhaust from 35 will divide into two streams. A portion of the cooled exhaust gas will return through recirculated exhaust gas conduit 4 to the engine and the remainder exhausted through exhaust discharge conduit 36. At low power requirements from the engine, most of the exhaust gas will be recirculated to the engine. Heat from the engine through 25a is exchanged with water entering the tube side of vaporizer heat exchanger 32. This water enters the tube side of 32 from partially heated water conduit 30b. The second engine exhaust entering the heat recovery system occurs during stroke 6 which is shown in FIG. 6 and is from steam exhaust conduit 21 going into the shell side of heat recovery heat exchanger 33. Heat from the engine through conduit 21 is exchanged with water on the tube side of 33 by way of water conduit 30a which is pressurized by water recirculation pump 30. The partially cooled steam exits the shell side of exchanger 33 through partially cooled steam conduit 21a and enters the tube side of condenser heat exchanger 34 where the steam is condensed to water and stored in condensed steam reservoir 21b. The heat from conduit 21a will be removed by water entering shell side of exchanger 34 through cooling water supply conduit 37 and returning through cooling water return conduit 38. This water will be recirculated through a radiator type cooling system common to water cooled internal combustion engines. The radiator water cooling system is not shown since those versed in the art are very familiar with this type of cooling system. The water in reservoir 21b is recirculated by water recirculation pump 30 through water conduit 30a back to the tube side of heat recovery heat exchanger 33. There will be some non-condensable gases mixed with the steam from conduit 21a and these will be removed through non-condensables vacuum pump 40 discharging to atmosphere through non-condensables conduit 41.

Figure 1A:
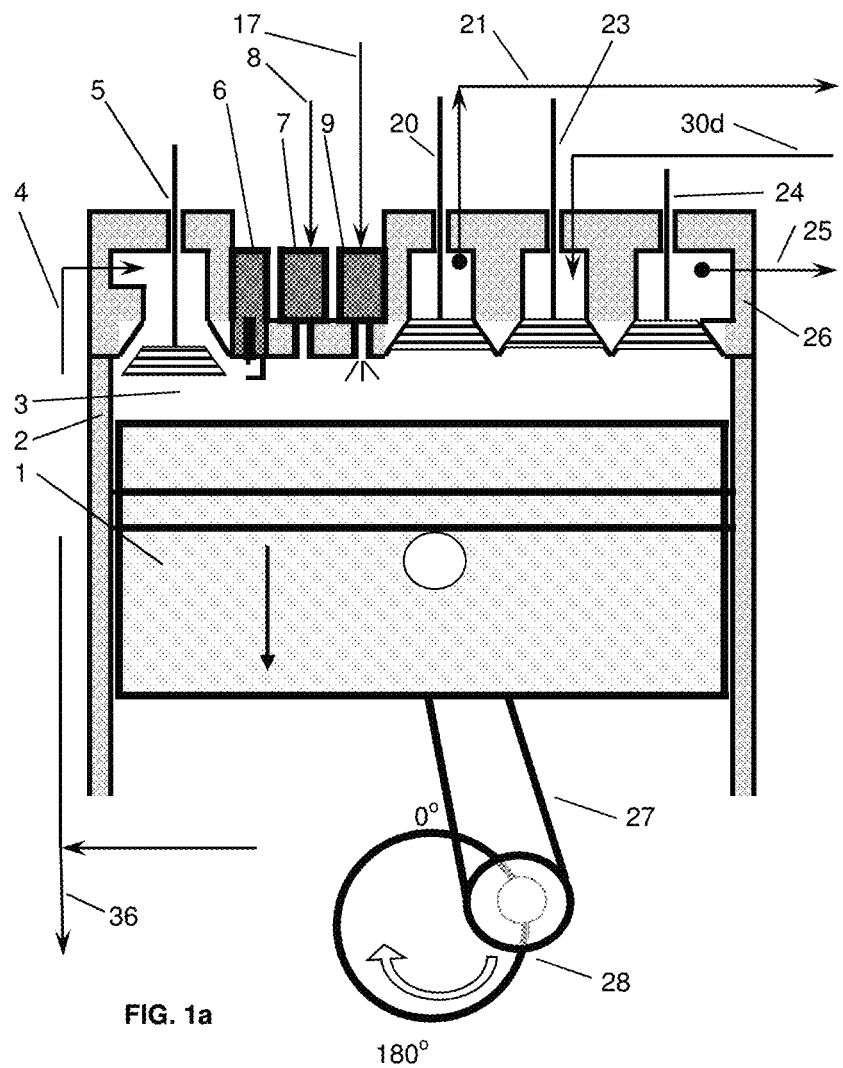
FIG. 1a depicts the first stroke of the engine without the heat recovery system. In this stroke, the crankshaft rotates from 0 to 180 degrees (from Top Dead Center, TDC to Bottom Dead Center, BDC). This figure and subsequent

FIG. 1a is a cross sectional view of piston 1 inside cylinder 2 complete with valves, injection valves, and spark plug 6 as would be used in a spark ignited engine. This figure depicts the first stroke of an internal combustion engine called the intake stroke by those skilled in the art. This stroke commences when crankshaft 28 is at crankshaft rotation angle 0 degrees (TDC) and goes until crankshaft 28 rotation is at 180 degrees (BDC). Piston 1 reciprocates within cylinder 2 and this reciprocating movement results in varying the volume of combustion chamber 3. The piston is connected through connecting rod 27 to crankshaft 28. This assembly of items 1, 27 and, 28 converts the reciprocating motion of the piston into the rotary motion of crankshaft 28. Recirculated exhaust gas conduit 4 allows the entrance of exhaust gas into combustion chamber 3 when recirculated exhaust intake valve 5 is open and piston 1 is descending. Oxygen for the fuel to be injected later, is fed through oxidizer conduit 17 for addition to combustion chamber 3 through oxidizer injection valve 9. The piston 1 ceases its downward motion when the piston reaches crankshaft 28 rotation angle 180 degrees, also known as bottom dead center (BDC). BDC is the point of greatest volume of combustion chamber 3. Valve 5 closes proximate crankshaft angle 180 degrees, thus completing stroke 1 with combustion chamber 3 filled with a mixture of oxidizer and recirculated exhaust gas. For this description, proximate refers to the opening or closing of a valve or the firing of a spark plug plus or minus 50 crankshaft angle degrees. For the example above, valve 5 begins closing as early as crankshaft angle 130° (180°−50°) and completes closing as late as crankshaft angle 230° (180°+50°).

Figure 1B:
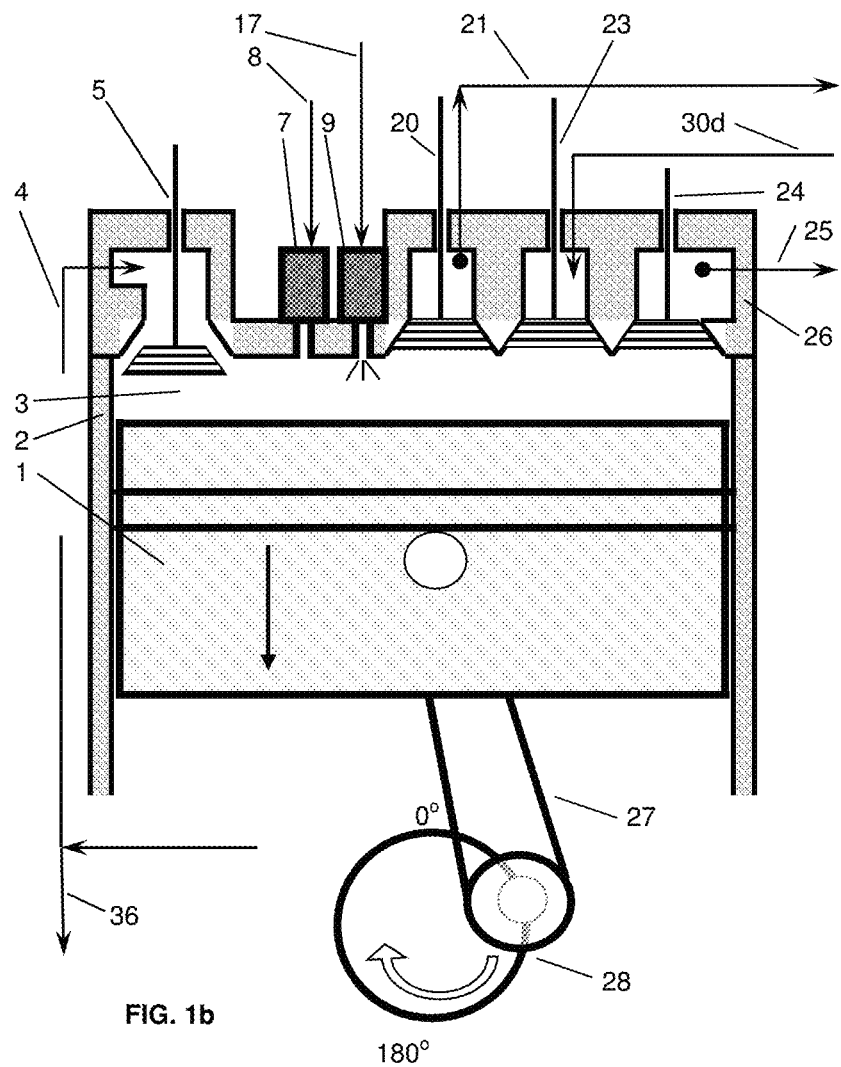
FIG. 1b depicts the first stroke the same as FIG. 1a but for a compression ignition (CI) engine. There is no spark plug. It should be understood that this invention is applicable to both spark ignition and compression ignition engines.

FIG. 1b depicts the same thing happening as FIG. 1a except spark plug 6 is not included. This depiction is of a compression ignition engine rather than a spark ignition engine. In a compression ignition engine, the temperature from the compression of the gas in the combustion chamber is sufficient to ignite the fuel used in such an engine.

Figure 2:
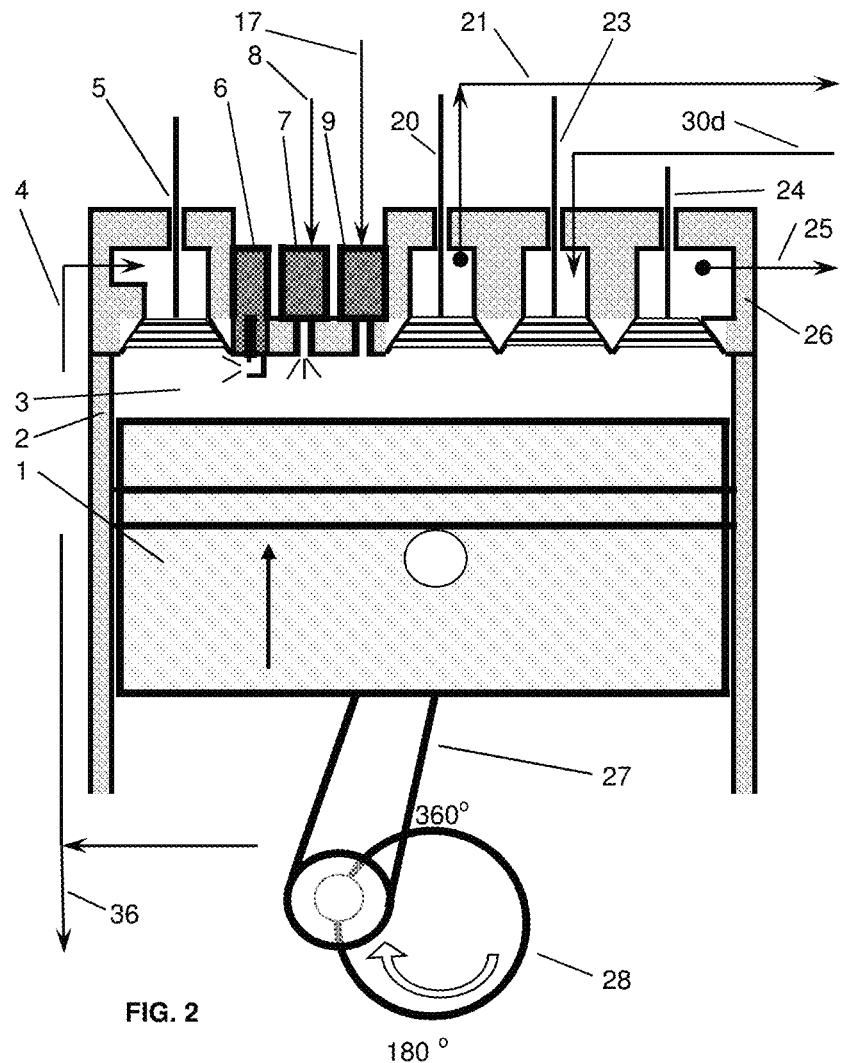
FIGS. 2 through 6 show the piston, cylinder, cylinder head, combustion chamber, four different valves, spark plug or other igniting device, fuel injection valve, oxidizer injection valve, conduits, connecting rod, and crankshaft. This stroke is classically described by those versed in the art as the intake stroke. Oxidizer enters the cylinder with recirculated exhaust gas during this stroke.

FIG. 2 depicts the second stroke of an internal combustion engine called the compression stroke. This stroke commences when the crankshaft is at rotation angle 180 degrees and goes until the crankshaft rotation angle is 360 degrees. All valves 5, 20, 23, and 25 remain closed during this stroke while pressure builds in the combustion chamber. Fuel may be added to the oxidizer and recirculated exhaust gas mixture in several different ways and these ways are familiar to those skilled in the art. These include the use of a carburetor, injecting fuel into the gases entering the combustion chamber but before the intake valve, and injecting fuel directly into the combustion chamber. The first two methods of introducing fuel into the oxidizer are not illustrated in the drawings. In the preferred embodiment, the third method is illustrated and described. Fuel is added directly to the combustion chamber 3 during this stroke through the fuel injection valve 7 by way of fuel conduit 8. Proximate the end of this stroke, as the crankshaft approaches 360 degrees, spark plug 6 is energized and the resulting arc begins the rapid combustion or oxidation process. The spark may be retarded to fire after the crankshaft has passed the 360 degree rotation, but in any case, almost all of the effect of the explosion of the fuel and oxygen is in stroke three.

Figure 3:
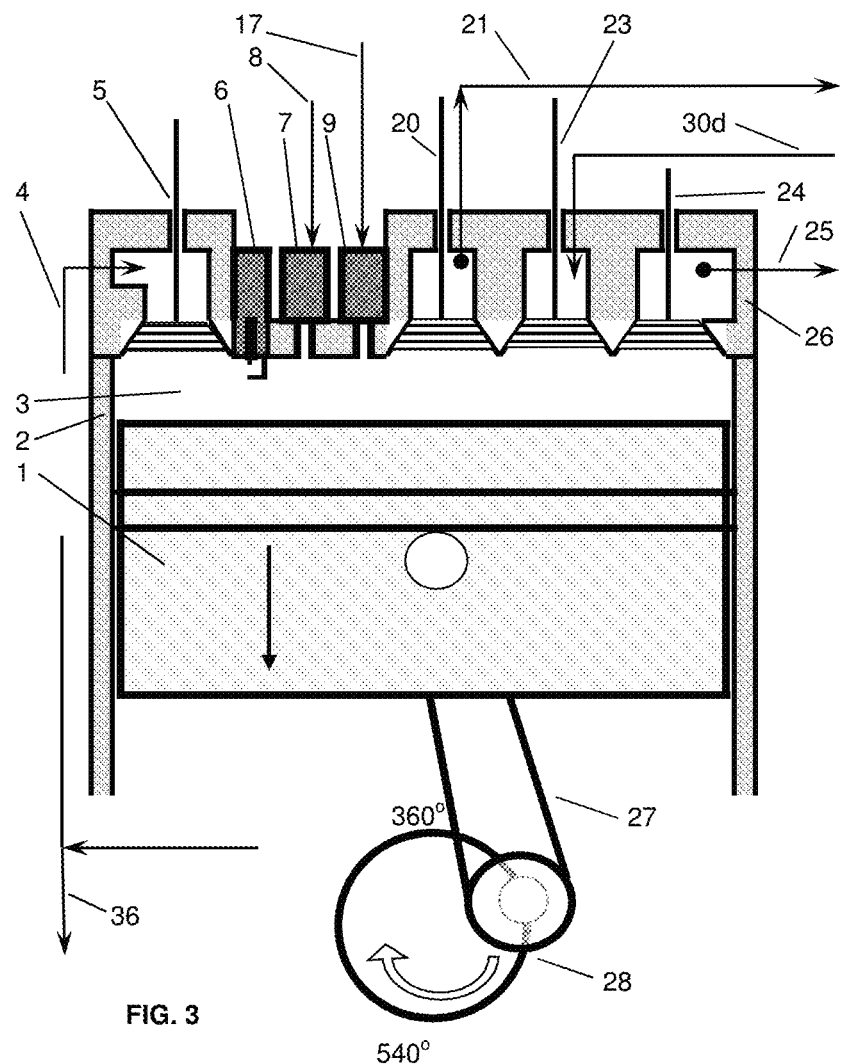
Figure 4:
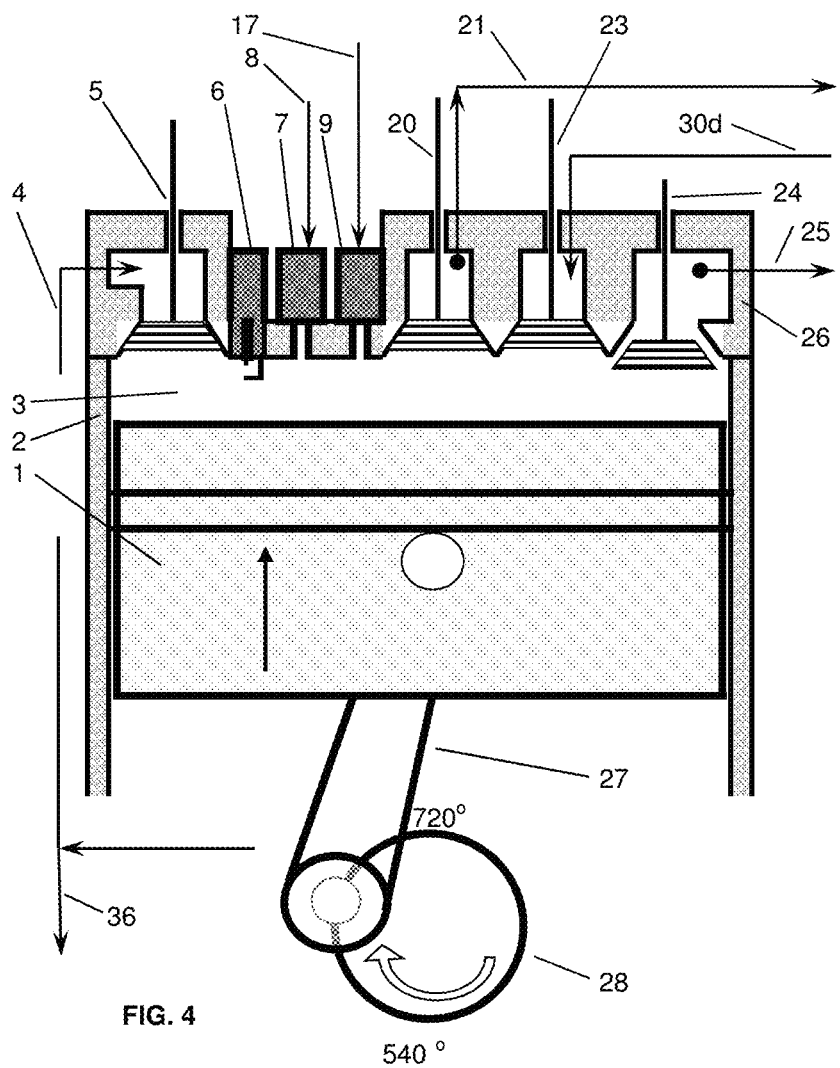

FIG. 3 depicts the third stroke of an internal combustion engine called the power stroke. In the case of this invention, this is power stroke one since there are two power strokes. This stroke commences when the crankshaft is at rotation angle 360 degrees and goes until the crankshaft rotation angle is 540 degrees. Valves 5, 20, 23, and 24 remain closed during this stroke but fuel may be injected several times during this stroke. During the combustion of the fuel with the oxygen, there is a rapid rise in the temperature and pressure inside combustion chamber 3. This pressure exerted on the exposed face of piston 1 as it descends inside cylinder 2 produces work. In this manner, the heat released from the combustion of fuel is converted to work. Power continues to be derived until the crankshaft reaches 540 degrees of rotation. Proximate crankshaft rotation angle 540, combustion exhaust valve 24 begins opening to release the hot exhaust gases into combustion exhaust conduit 25. This valve opening is graphically shown in FIG. 4 since combustion exhaust valve 24 remains open through almost all of stroke 4.

FIG. 4 depicts the fourth stroke of an internal combustion engine called the exhaust stroke. In the case of this invention, this is exhaust stroke one since there are two exhaust strokes. This stroke commences when the crankshaft is at rotation angle 540 degrees and goes until the crankshaft rotation is at 720 degrees. Combustion exhaust valve 24 remains open during this stroke to allow the hot exhaust gas to pass through combustion exhaust conduit 25 into steam super heater exchanger 31 previously described in FIG. 1. Exhaust continues until the crankshaft reaches 720 degrees. Late in this stroke, proximate crankshaft rotation angle 720, combustion exhaust valve 24 begins closing in preparation for stroke five. At the end of stroke four, there remains heat at elevated temperature in the metal of the cylinder head 26, valves and injection valves, piston 1, cylinder 2, and residual combustion gases in combustion chamber 3. Some of this heat will be converted to power during stroke five.

Figure 5:
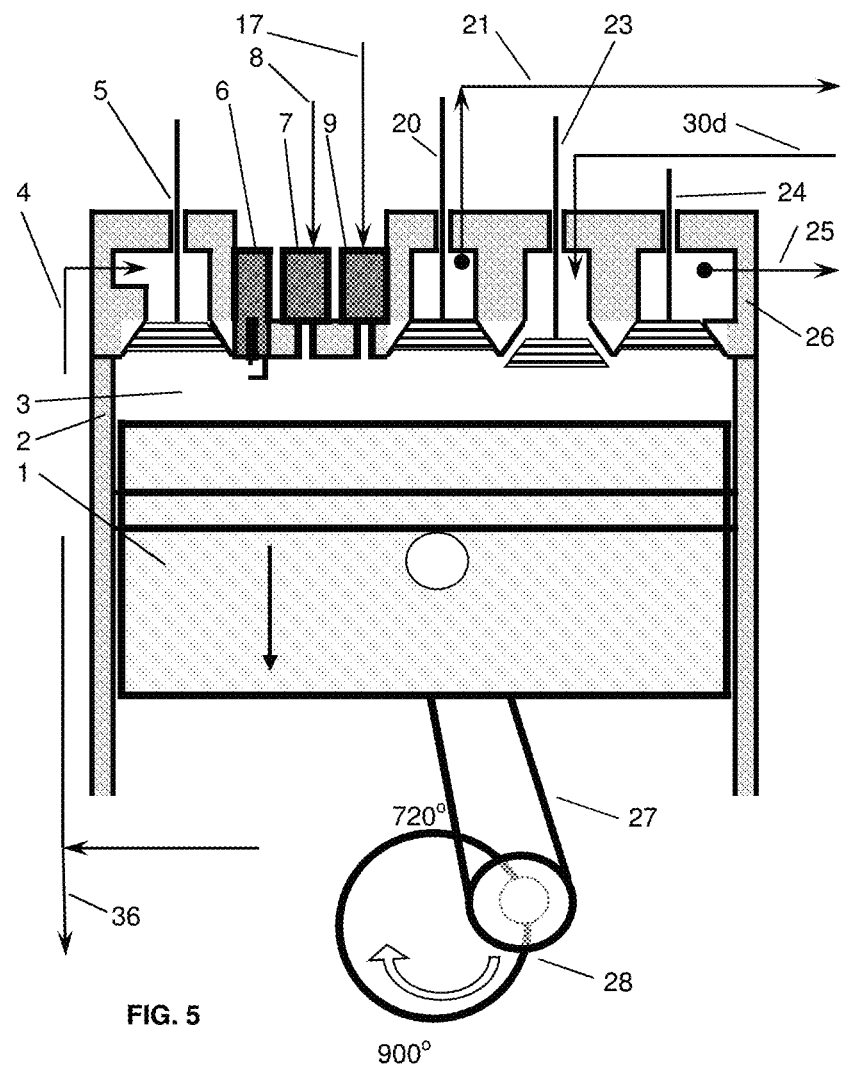
Figure 6:
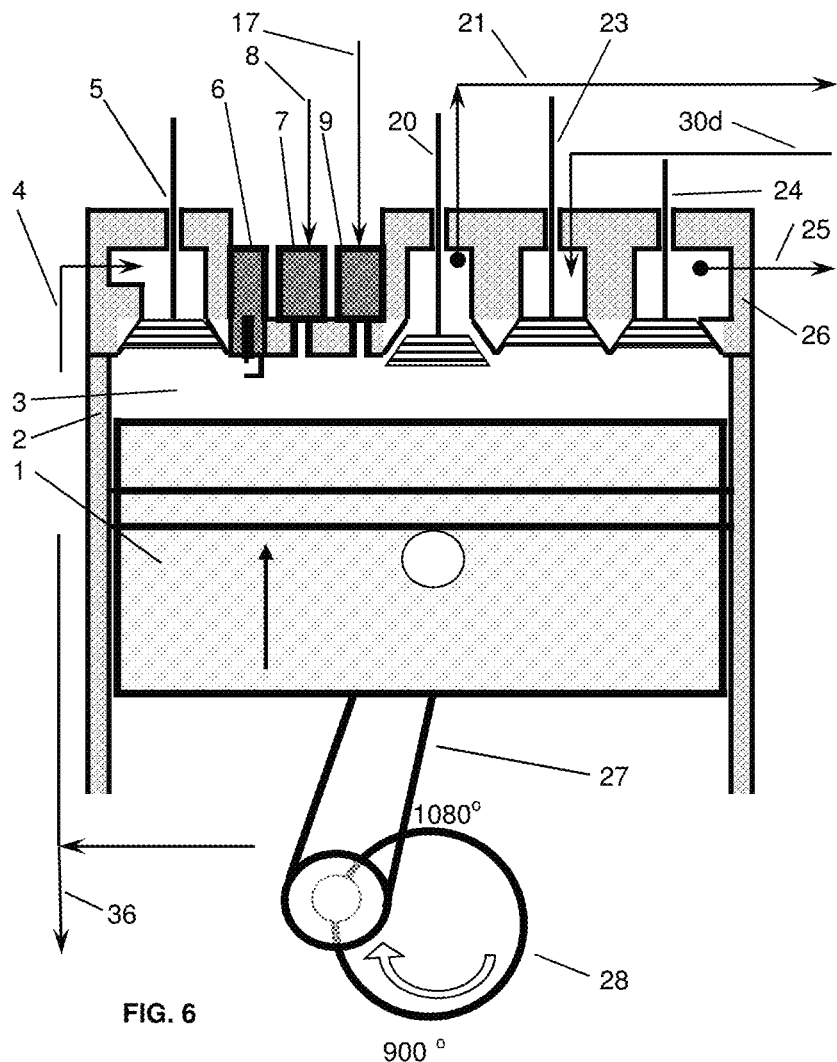

FIG. 5 depicts the fifth stroke of this six stroke internal combustion engine and is the second power stroke. This stroke commences when the crankshaft is at rotation angle 720 degrees and continues through rotation angle 900 degrees. Valves 5, 20, and 24 remain closed while superheated steam valve 23 is controlled to admit superheated steam from superheated steam conduit 30d into combustion chamber 3 from steam super heater exchanger 31. The superheated steam entering the combustion chamber produces additional work as the piston is driven toward the crankshaft. The quantity of superheated steam available is limited by energy balance and so its flow must be controlled. Superheated steam is steam or water vapor at a temperature higher than its vaporization or boiling point at the absolute pressure where the temperature is measured. Superheated steam is preferred to saturated steam as water condensation in the combustion chamber is not desired. A portion of the heat in the metal of cylinder head 26; piston 1; valves 5, 20, 23, and 24; spark plug 6; injection valves 7 and 9; and cylinder 2 is also used as a heat source. This heat from the metal walls also reduces the possibility of steam condensation inside the combustion chamber. Engine cooling is taking place during this stroke. This engine heat from the metal surrounding the combustion chamber is converted to work instead of being discarded through the cooling jacket of the engine. For this reason, a water jacket on the cylinder of this engine is not needed.

FIG. 6 depicts the sixth stroke of this six stroke internal combustion engine and is the second exhaust stroke. This stroke commences when the crankshaft is at rotation angle 900 degrees and goes until the crankshaft rotation is at 1080 degrees. In this stroke, the exhaust is primarily steam rather than products of combustion. Steam exhaust valve 20 opens completely during this stroke, allowing low pressure steam to exhaust through steam exhaust conduit 21 on its way to heat recovery heat exchanger 33 as previously described.

Figure 7:
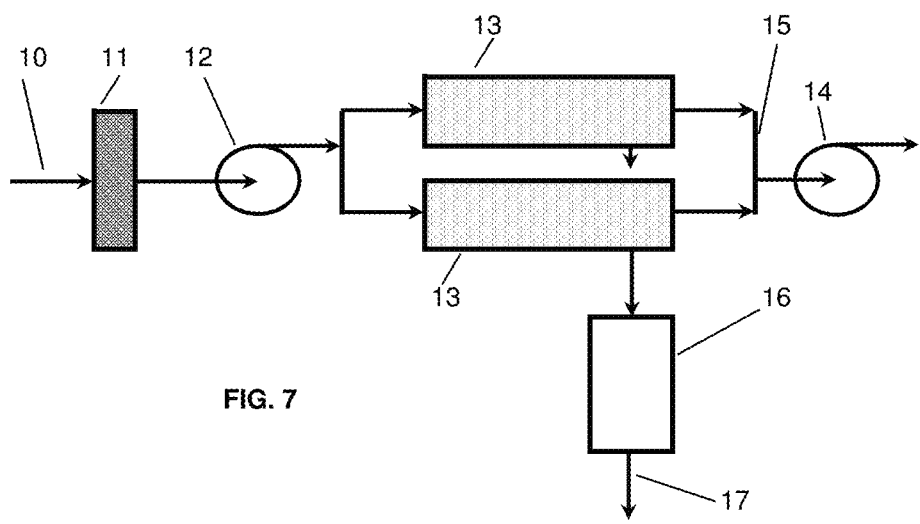
FIG. 7 depicts an apparatus for producing oxygen-enriched air. The depiction shown is for a Vacuum Pressure Swing Adsorber (VPSA) containing molecular sieve, also known as zeolite. There are other ways of enriching air with oxygen but this method is widely practiced, relatively small, and is energy efficient. This air separation technology is in the public domain. Air enters the device and is filtered and then compressed. The compressed air is fed to one or more beds containing an adsorbent, preferably molecular sieve which preferentially adsorbs either nitrogen or oxygen while the non-preferentially adsorbed gas passes through the bed. In the case shown, nitrogen is the preferentially adsorbed component from the gas. One or more beds are processing the filtered compressed air while the other bed or beds are being regenerated. Vacuum is used to remove the adsorbed nitrogen from the bed of molecular sieve being regenerated. The gas exiting the bed of molecular sieve is primarily oxygen and argon and is stored in an accumulator under pressure for use in the internal combustion engine. Most of the carbon dioxide and water are also adsorbed and removed from the entering air.

FIG. 7 depicts a vacuum pressure swing adsorber (VPSA) which is able to produce oxygen-enriched air which is used as the oxidizer in this invention. Any source of oxygen-enriched air or even pure oxygen is suitable for operating this invention and is not limited to VPSA. The oxygen in the oxygen-enriched air or in pure oxygen is the oxidizer for the fuel while other low concentration components including argon, carbon dioxide, and water vapor pass through the engine unreacted. VPSA is the preferred method of generating oxygen-enriched air with an oxygen concentration between 80 and 97%. The higher the oxygen concentration in the oxidizer results in a higher recycle of exhaust gas to stroke one resulting in higher thermal efficiency and lower NOx in the exhaust. The low level of nitrogen in the oxygen-enriched air is prevented from reacting to NOx by controlling the combustion temperature. This VPSA device draws in ambient air through air intake conduit 10 followed by air filter 11 followed by compressor 12. The VPSA device consists of one or more beds of zeolite, also known as molecular sieve in adsorbent bed 13. The molecular sieve or other suitable adsorbent preferentially adsorbs nitrogen, carbon dioxide, and water out of the air while oxygen and argon pass through the bed to oxidizer accumulator 16. Oxygen-enriched air passes through oxidizer conduit 17 on its way to the engine. Adsorbent bed 13 normally consists of two beds of adsorbent. One, two, three, or more beds may be used. While one or more beds are adsorbing nitrogen, carbon dioxide, and water as the compressed air passes through, the other bed or beds are being regenerated under a vacuum. The regeneration vacuum is provided by vacuum pump 14 with the desorbed nitrogen, carbon dioxide, and water exiting through the nitrogen-enriched air conduit 15. The end product from the VPSA unit is oxygen-enriched air which is also referred to as oxidizer.

Figure 8:
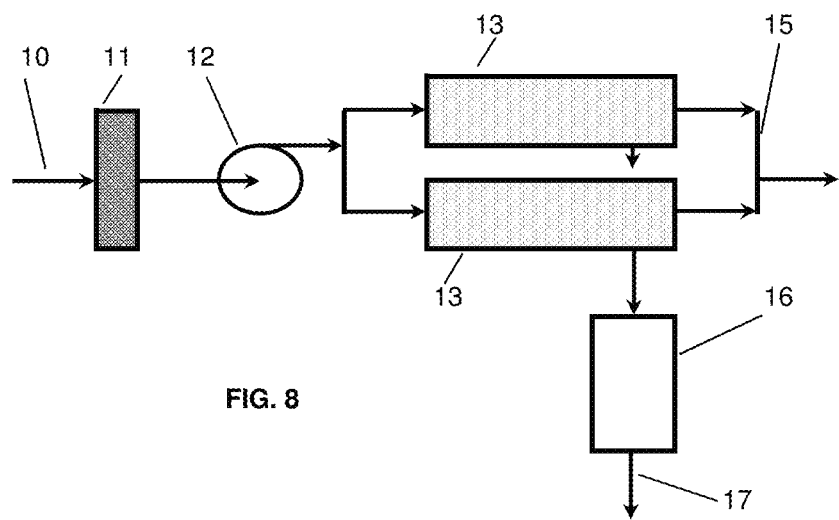
FIG. 8 depicts a pressure swing adsorber (PSA) which is able to produce oxygen-enriched air which can be used as the oxidizer in this invention. This PSA device draws in ambient air through an air filter by a compressor. The PSA device consists of one or more beds of zeolite, also known as molecular sieve. The molecular sieve or other suitable adsorbent preferentially adsorbs nitrogen, carbon dioxide, and water out of the air while oxygen and argon pass through the bed to storage. Oxidizer flows from the accumulator to the engine. Two or more beds of adsorbent are used with one bed adsorbing nitrogen, carbon dioxide, and water as the compressed air passes through that bed and the other bed is being regenerated during the pressure release of the gas in the bed.

FIG. 8 depicts a pressure swing adsorber (PSA) which is able to produce oxygen-enriched air which is used as the oxidizer in this invention. This PSA device draws in ambient air through air intake conduit 10 followed by air filter 11 followed by compressor 12. The PSA device consists of one or more beds of zeolite, also known as molecular sieve in adsorbent bed 13. The molecular sieve or other suitable adsorbent preferentially adsorbs nitrogen, carbon dioxide, and water out of the air while oxygen and argon pass through the bed to oxidizer accumulator 16. Oxygen-enriched air passes through oxidizer conduit 17 on its way to the engine. Adsorbent bed 13 normally consists of two beds of adsorbent with one bed adsorbing nitrogen, carbon dioxide, and water as the compressed air passes through that bed and the other bed is being regenerated during the pressure release of the gas in the bed. The desorbed nitrogen, carbon dioxide, and water exit through the nitrogen-enriched air conduit 15.

Figure 9:
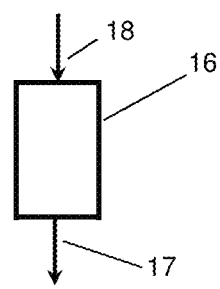
FIG. 9 depicts a storage tank of essentially pure oxygen which has come from an outside source. This oxygen would be typically obtained from the cryogenic separation of air. Essentially pure oxygen is used as the oxidizer for this engine if the oxidizer comes from cryogenically separated air.

FIG. 9 depicts a storage tank of essentially pure oxygen which has come from an outside source. Filler conduit 18 is used to filled oxidizer accumulator 16 with liquid or gaseous oxygen, typically obtained from the cryogenic separation of air. Essentially pure oxygen passes through oxidizer conduit 17 on its way to the engine.

Other processes for providing oxidizer to this engine include, but are not limited to, membrane separation of air; oxygen chemisorption/desorption; decomposition of certain chemicals which release oxygen; and electrolysis of water.

This engine has been meticulously modeled in both the CI and SI modes to estimate and optimize the thermal efficiency. In a CI engine with a compression ratio of 15:1, an oxidizer with 95% oxygen composition, 1500 rpm engine speed, and a calculated combustion temperature of 1641 to 1834° F. (894 to 1001° C.), the thermal efficiency from fuel alone may be between about 61% to about 70%. The exhaust composition may be about 0.5% nitrogen and about 5% oxygen by volume. This nitrogen and oxygen composition in the exhaust coupled with the low combustion temperature will result in extremely low CO, HC, and NOx compositions. In the SI engine with a compression ratio of 11.3:1, an oxidizer with 95% oxygen composition, 1500 rpm engine speed, and a calculated combustion temperature of 1651 to 1846° F. (899 to 1008° C.), the thermal efficiency from fuel alone may be between about 55% to about 59%. The exhaust composition may be about 0.6% nitrogen and about 6% oxygen by volume. This nitrogen and oxygen composition in the exhaust coupled with the low combustion temperature will result in extremely low CO, HC, and NOx compositions. There is a reduced specific power per displacement volume in this engine due to the high temperature in the combustion chamber with this level of oxygen.

In general, terms such as "coupled to," and "configured for coupling to," and "secured to," and "configured for securing to" and "configured for controlling" and "configured for allowing" and "configured for receiving" and "configured for removing" and "connected to" (for example, a first component is "connected to" or "is configured for connecting to" a second component) are used herein to indicate a structural, functional, mechanical, electrical, signal, optical, magnetic, electromagnetic, ionic or fluidic relationship between two or more components or elements. As such, the fact that one component is said to be connected to a second component is not intended to exclude the possibility that additional components may be present between, and/or operatively associated or engaged with, the first and second components.

It will be understood that various aspects or details of the invention may be changed without departing from the scope of the invention. Furthermore, the foregoing description is for the purpose of illustration only, and not for the purpose of limitation—the invention being defined by the claims.

The invention claimed is:

1. A six stroke internal combustion engine comprising:
   (a) At least one combustion chamber bounded by a cylinder, a cylinder head, and a piston reciprocally connected to a crankshaft through a connecting rod,
   (b) a recirculated exhaust intake valve connected to a recirculated exhaust gas conduit, where the recirculated exhaust intake valve is configured for allowing exhaust gas to be recirculated to the combustion chamber,
   (c) an oxidizer injection valve connected to an oxidizer accumulator through an oxidizer conduit, where the oxidizer injection valve is configured for controlling the flow of oxidizer composed of greater than 80% to and including 97% oxygen by volume entering the combustion chamber,
   (d) a fuel injection valve connected to a fuel conduit, where the fuel injection valve is configured for controlling the flow of fuel entering the combustion chamber,
   (e) a means for igniting a mixture of fuel and oxidizer composed of greater than 80% to and including 97% oxygen by volume is provided within the combustion chamber proximate top dead center within the combustion chamber,
   (f) a combustion exhaust valve connecting the combustion chamber with a steam super heater exchanger through a combustion exhaust conduit,
   (g) a superheated steam valve connected to a superheated steam conduit, where the superheated steam valve is configured for controlling the flow of superheated steam to the combustion chamber from the steam super heater exchanger,
   (h) a steam exhaust valve connecting the combustion chamber with a heat recovery heat exchanger through a steam exhaust conduit, where the steam exhaust valve is configured for controlling the flow of steam exhaust from the combustion chamber, and
   (i) a heat recovery system configured for generating superheated steam for return to the combustion chamber through the superheated steam conduit and generating cooled combustion exhaust gas for return to the combustion chamber through the recirculated exhaust gas conduit.

2. The engine of claim 1 wherein the heat recovery system comprises:
   (a) a steam super heater exchanger configured for receiving combustion exhaust from a fourth stroke through the combustion exhaust conduit and exchanging heat from the combustion exhaust with the steam from the steam conduit to produce superheated steam for return to the combustion chamber through the superheated steam conduit;
   (b) a vaporizer heat exchanger configured for receiving partially cooled combustion exhaust from the steam super heater exchanger through a partially cooled exhaust conduit and exchanging heat from the partially cooled combustion exhaust with partially heated water from a partially heated water conduit;
   (c) an exhaust gas heat exchanger configured for receiving further cooled combustion exhaust from the vaporizer heat exchanger through a further cooled exhaust conduit and cooling the further cooled combustion exhaust for return to the combustion chamber as recirculated exhaust gas through the recirculated exhaust gas conduit;
   (d) a heat recovery heat exchanger configured for receiving partially depressurized steam from a sixth stroke through the steam exhaust conduit and exchanging heat from the partially depressurized steam with water from a water conduit;
   (e) a condenser heat exchanger configured for receiving partially depressurized and cooled steam from the heat recovery heat exchanger through a partially cooled steam conduit and condensing the partially depressurized and cooled steam to water stored in a condensed steam reservoir.

3. The engine of claim 1 wherein the ignition of the mixture of the fuel and said oxidizer composed of greater than 80% to and including 97% oxygen by volume is initiated by the heat and temperature due to compression within the combustion chamber.

4. The engine of claim 1 wherein the ignition of the mixture of the fuel and said oxidizer composed of greater than 80% to and including 97% oxygen by volume is initiated by an electrical discharge from a spark plug.

5. The engine of claim 1 wherein the fuel is a mixture of hydrocarbon and hydrogen.

6. A method of operating an internal combustion engine having a piston moving reciprocally inside a cylinder and driving a crankshaft to provide a six stroke cycle, the method comprising the steps of:
   performing a first-stroke cycle having:
      (a) a first event in which the piston travels inside the cylinder in the direction toward the crankshaft with a recirculated exhaust intake valve open, an oxidizer injection valve controllably throttling an oxidizer composed of greater than 80% to and including 97% oxygen by volume into a combustion chamber, and with a fuel injection valve, a steam exhaust valve, a superheated steam valve, and a combustion exhaust valve closed,
      (b) a second event in which both the recirculated exhaust intake valve and the oxidizer injection valve are closed proximate the end of the piston travel;
   performing a second-stroke cycle having:
      (a) a first event in which the piston inside the cylinder travels away from the crankshaft compressing a mixture of recirculated exhaust gas and said oxidizer composed of greater than 80% to and including 97% oxygen by volume with the recirculated exhaust intake valve, the oxidizer injection valve, the steam exhaust valve, and the combustion exhaust valve closed and with the fuel injection valve controllably throttling fuel into the combustion chamber to create a combustible mixture of fuel and said oxidizer composed of greater than 80% to and including 97% oxygen by volume,
      (b) a second event in which combustion of the fuel and said oxidizer composed of greater than 80% to and including 97% oxygen by volume is initiated proximate the end of the piston travel away from the crankshaft;
   performing a third-stroke cycle having:
      (a) a first event in which the recirculated exhaust intake valve, the fuel injection valve, the oxidizer injection valve, the steam exhaust valve, the super heated steam valve, and the combustion exhaust valve are closed, with the piston traveling toward the crankshaft due to the expansion of the combusting fuel and oxidizer mixture;
      (b) a second event in which the combustion exhaust valve opens proximate the end of the piston travel toward the crankshaft;
   performing a fourth-stroke cycle having:
      (a) a first event in which the combusted gases are discharged through the open combustion exhaust valve into a steam super heater exchanger, followed by a vaporizer heat exchanger, followed by an exhaust gas heat exchanger, followed by partial return of the exhaust gas to the first stroke as the piston advances away from the crankshaft, the first event ending as the piston nears its end of travel away from the crankshaft,
      (b) a second event in which the combustion exhaust valve closes proximate top dead center,
      (c) a third event in which the superheated steam valve opens to controllably meter superheated steam into the combustion chamber proximate the end of travel of the piston away from the crankshaft;
   performing a fifth-stroke cycle having:
      (a) a first event in which the superheated steam valve closes and the pressure exerted by this steam inside the combustion chamber, coupled with the pressure resulting from the heat from cooling the surfaces surrounding the combustion chamber, forces the piston to travel toward the crankshaft,
      (b) a second event in which the steam exhaust valve is opened proximate the end of travel of the piston toward the crankshaft;
   performing a sixth-stroke cycle having:
      (a) a first event in which the steam in the combustion chamber exhausts through the steam exhaust valve to the heat recovery heat exchanger, followed by the condenser heat exchanger, followed by condensed water flow through the other side of the heat recovery heat exchanger as the piston travels away from the crankshaft,
      (b) a second event in which the steam exhaust valve closes proximate the end of travel of the piston away from the crankshaft,
      (c) a third event in which the recirculated exhaust intake valve opens proximate the end of travel of the piston away from the crankshaft.

7. The method of claim 6 further comprising the heating of water and of steam by the combustion exhaust and by the steam exhaust to produce superheated steam and cooled exhaust gas in the heat recovery system for return to the engine.

8. The method of claim 6 in which the combustion exhaust from engine stroke four discharges through a combustion exhaust conduit to a steam super heater exchanger and the heat from the combustion exhaust is used to super heat the steam for return to the combustion chamber.

9. The method of claim 6 in which the steam exhaust from stroke six discharges through a steam exhaust conduit to a heat recovery heat exchanger and the heat from this steam exhaust is used to preheat water flowing to the heat recovery heat exchanger followed by a vaporizer heat exchanger followed by a steam super heater exchanger.

10. The engine of claim 1 wherein the fuel is 100% hydrocarbon.

11. The engine of claim 1 wherein the fuel is 100% hydrogen.

* * * * *